(12) United States Patent
Armbruster

(10) Patent No.: US 10,131,078 B2
(45) Date of Patent: Nov. 20, 2018

(54) INJECTION MOULDING DEVICE HAVING A ROTATABLE CENTRE PART

(71) Applicant: FOBOHA (GERMANY) GMBH, Haslach (DE)

(72) Inventor: Rainer Armbruster, Wolfach (DE)

(73) Assignee: FOBOHA (GERMANY) GMBH, Haslach (CH)

( * ) Notice: Subject to any disclaimer, the term of this patent is extended or adjusted under 35 U.S.C. 154(b) by 0 days.

(21) Appl. No.: 14/776,381

(22) PCT Filed: Mar. 11, 2014

(86) PCT No.: PCT/EP2014/054715
§ 371 (c)(1),
(2) Date: Sep. 14, 2015

(87) PCT Pub. No.: WO2014/140021
PCT Pub. Date: Sep. 18, 2014

(65) Prior Publication Data
US 2016/0039136 A1 Feb. 11, 2016

(30) Foreign Application Priority Data

Mar. 15, 2013 (CH) .................................... 0613/13
Dec. 13, 2013 (CH) .................................... 2062/13

(51) Int. Cl.
*B29C 45/04* (2006.01)
*B29C 45/26* (2006.01)
(Continued)

(52) U.S. Cl.
CPC ........ *B29C 45/2606* (2013.01); *B29C 45/045* (2013.01); *B29C 45/1628* (2013.01);
(Continued)

(58) Field of Classification Search
CPC .............. B29C 45/045; B29C 45/1628; B29C 45/1742; B29C 45/2606; B29C 45/2681;
(Continued)

(56) References Cited

U.S. PATENT DOCUMENTS 4,408,981 A * 10/1983 Brown ................ B29C 45/1761
425/338
4,929,166 A * 5/1990 DiSimone ............ B23Q 1/0063
264/328.7

(Continued)

FOREIGN PATENT DOCUMENTS

CH 705 140 A2 12/2012
CN 1950186 A 4/2007
(Continued)

*Primary Examiner* — James P Mackey
(74) *Attorney, Agent, or Firm* — Pauley Erickson & Kottis

(57) ABSTRACT

The invention relates to a retaining device (5) for a rotatable center block (17) in an injection molding device (1), comprising a lower rotary plate (14) rotatable about an axis of rotation (13) and driven by a motor (15), the lower rotary plate being used for retaining the rotatable center block (17). The retaining device (5) comprises a lower cross member (7), which is mounted movably in the longitudinal direction (x) on guide rails (9) while supported on a machine bed of the injection molding device by means of first bearing blocks (8). The retaining device (5) can have two bearing blocks (16), by means of which the lower cross member (7) is supported in the circumferential direction relative to lower beams (4) of the injection molding device. For a further increase in efficiency, the center block (17) has a main body made of a material of lower density than a coupling plate (23) operatively connected thereto.

14 Claims, 2 Drawing Sheets

(51) Int. Cl.
*B29C 45/16* (2006.01)
*B29C 45/17* (2006.01)
*B29C 45/32* (2006.01)

(52) U.S. Cl.
CPC ...... *B29C 45/1742* (2013.01); *B29C 45/2681* (2013.01); *B29C 2045/1764* (2013.01); *B29C 2045/326* (2013.01)

(58) Field of Classification Search
CPC .... B29C 2045/0458; B29C 2045/1617; B29C 2045/326; B29C 33/0088; B29C 33/38; B29C 33/3842; B29C 2045/1764
See application file for complete search history.

(56) References Cited

U.S. PATENT DOCUMENTS

| | | | | |
|---|---|---|---|---|
| 5,578,333 | A * | 11/1996 | Schad | B29C 45/32 425/338 |
| 5,772,420 | A * | 6/1998 | Holmes | B29C 45/1761 425/450.1 |
| 6,099,784 | A * | 8/2000 | Teng | B29C 45/32 264/297.2 |
| 6,503,075 | B1 * | 1/2003 | Schad | B29C 45/32 425/338 |
| 7,134,869 | B2 * | 11/2006 | Lichtinger | B29C 45/1628 425/576 |
| 8,360,764 | B2 | 1/2013 | Armbruster et al. | |
| 8,469,693 | B2 * | 6/2013 | Schad | B22D 17/22 425/190 |
| 8,672,668 | B2 | 3/2014 | Armbruster | |
| 8,764,434 | B2 | 7/2014 | Armbruster | |
| 9,168,687 | B2 * | 10/2015 | Armbruster | B29C 45/045 |
| 2006/0244178 | A1 * | 11/2006 | Armbruster | B29C 45/006 264/255 |
| 2014/0134366 | A1 | 5/2014 | Armbruster | |
| 2014/0308388 | A1 | 10/2014 | Armbruster | |

FOREIGN PATENT DOCUMENTS

| | | |
|---|---|---|
| EP | 1 035 959 B1 | 9/2000 |
| EP | 1 119 449 B1 | 8/2001 |
| EP | 1 155 802 A2 | 11/2001 |
| EP | 1 725 386 A1 | 11/2006 |
| JP | H02 171221 A | 7/1990 |
| WO | WO 2007/082394 A1 | 7/2007 |
| WO | WO 2011/107395 | 9/2011 |

* cited by examiner

INJECTION MOULDING DEVICE HAVING A ROTATABLE CENTRE PART

BACKGROUND OF THE INVENTION

Field of the Invention

The present invention relates to the field of tools and machines for injection molding of plastic and other thermoplastic materials.

Discussion of Related Art

Injection molding devices having one or more rotating center parts are known from the prior art. These are used for the efficient manufacture of multi-component plastic parts by injection molding. At least one rotatable mold center part (center block), which is fixed to a holding device and is rotatably arranged about an axis of rotation, is arranged between two mold halves, the mold halves being movable against one another along tie bars in a first direction. The rotatable mold center part has at least two parallel side surfaces, along which it interacts with the two mold halves for the formation of the cavities. In certain embodiments, the rotatable mold center part can interact at least on one side with a further rotatable mold center part. Coordinating means effect that the rotatable mold center part remains positioned centrally between the two mold halves during opening and closing, and thus collisions are avoided. Several holding devices for the rotatable middle part are known from the prior art.

EP1035959 and EP1155802 were published in 1999 by the same applicant, and both relate to a holding device for a rotatable center part (mold, mold half, mold carrier). The holding device has a lower and an upper cross member which are guided along the tie bars of an injection molding machine. Each cross member of the holding device has a rotatable holding means, which serves for releasable clamping the mold, mold half or the mold carrier therebetween.

EP1725386 of the same applicant was published in 2005, and relates to a method and an injection molding device with more than one rotatable center part. This makes it possible to manufacture parts in two outer parting planes and to assemble these in a further parting plane in a further manufacturing step. In the figures, different embodiments of holding devices for the rotatable center parts are illustrated.

WO2011/107395 by the same applicant was published in 2011 and describes a holding device with a modular structure, which can be flexibly adapted to different injection molding machines. Different types of holding are described.

EP1119449 by the company Krauss Maffei was first published in 2001 and shows a two-plate horizontal injection molding machine. This has a holding device for a rotatable center part mounted on the machine bed. The holding device in the invention is fully detached from the tie bars and has no operative connection with these. All occurring forces are transmitted via the machine bed.

An object of the invention is to further improve the injection molding devices known from the prior art with respect to their efficiency.

SUMMARY OF THE INVENTION

Reduction of cycle times is a viable means to increase production capacity. However, at the higher processing speeds associated therewith, increased forces also occur, as the machine parts must be more strongly accelerated and decelerated so that they can keep up with the pace of the machine. Optimal introduction and transmission of forces is an important aspect in order to be able to guarantee the robustness and durability of the device. Negatively impacting constraining forces are to be avoided. One aspect of the invention consists of targeted optimally apportioning the forces and the flow thereof across a plurality of machine elements. Thereby, the weight loads and the torques that act between a rotatable mold center part (center block) or a holding device therefor, respectively, and an injection molding machine, are partially or completely separately transmitted. Another aspect of optimization is the targeted weight reduction of certain parts.

A holding device according to the invention can be configured in several ways. In a preferred embodiment, the device has at least one base (lower holding device), the base being supported on a machine bed of the injection molding machine and displaceable in the longitudinal direction of tie bars of the injection molding machine.

A variant of the invention comprises a holding device for a mold center part in an injection molding machine, the mold center part being rotatable about a vertical axis. The holding device has a lower rotary plate which is rotatable about an axis of rotation and which is driven by a motor, the rotary plate serving to receive and hold the rotatable mold center part (center block). If necessary, a plurality of holding devices can be arranged one behind the other. The lower rotary plate is arranged rotatably about a vertical axis with respect to a lower cross member. The lower cross member is movably mounted in the longitudinal direction of the injection molding machine via first bearing blocks and guide rails being supported on a machine bed of the injection molding machine.

The holding device may comprise second bearing blocks, by means of which the lower cross member is supported in the circumferential direction relative to a pair of lower tie bars of the injection molding machine. To avoid negative forces relative to the tie bars, the second bearing blocks can be floatingly mounted at least in the vertical direction relative to the lower cross member. Alternatively or additionally, the second bearing blocks can be adjustably arranged relative to the lower cross member. Depending on the area of application, the second bearing blocks can form a unit with the first bearing blocks. The second bearing blocks may at least partially engage around the tie bars from the inside outwards. The second bearing blocks are advantageously arranged in pairs on a tie bars. If the forces do not exceed a certain level, the second bearing blocks may also be arranged diagonally with respect to the cross member. For a good transmission of forces, the second bearing blocks are arranged along the tie bar at a distance from one another. In order to achieve a structurally flexible arrangement, at least one second bearing block can be operatively connected from one side and/or from above with the cross member via an adapter. The cross member s advantageously formed in multiple parts, so that it can be flexibly adapted to the circumstances. It may have a central part and one or more side parts fixed thereon. In general, the second bearing blocks are fixed to the central part and/or at least on one of the side parts. Advantageously, attention is paid to short load paths. The second bearing blocks serve primarily for the transmission of the reaction forces which occur due to the drive torque. Weight forces are preferably transmitted via the first bearing blocks to the machine bed.

In certain cases, the cross member can also be formed as a (flat) base plate. At least one second bearing block may be arranged on or laterally on the base plate. At least one second bearing block may be releasable operatively connected to the cross member.

To improve efficiency through weight reduction and reduction of occurring forces, the invention provides a specially designed center block having a main body and at least one lower coupling plate fixed thereto. The main body is thereby manufactured from a material having a lower density than that of the lower coupling plate. For example, the main body can be manufactured from aluminum or another light metal and the at least one coupling plate can be manufactured from tool steel. Depending on the design of the holding device, the center block may also have an upper coupling plate. Further variants and constructive details can be found in the figures and the accompanying description. In one embodiment, the at least one coupling plate has at least one collector line, which operatively connects at least one connection arranged in the area of the coupling plate (e.g. in the form of a self-closing quick coupling) for media such as water, compressed air and/or hydraulics with at least one media distributor (riser) extending into the main body. The connection can be arranged on the main body or on the coupling plate. The center block according to the invention and holder described herein can also be used with other retainers or injection molding machines which are not described here. For this reason, the applicant reserves the right to further pursue this invention separately in one or more divisional applications.

The main body of the center block can be manufactured by means of a 3D-printing process. This has the advantage that the interior and in particular the media lines can be flexibly designed and optimally guided. This results in an optimized weight distribution and an improved cooling. Furthermore, the main body may have cavities which contribute to weight reduction. This is not possible in the case of conventionally manufactured main bodies. Alternatively or in addition, targeted reinforcements (not shown) can be inserted or incorporated. After hardening or tempering of the printed material, the side surfaces or the connecting surfaces can be mechanically finished as needed.

BRIEF DESCRIPTION OF THE DRAWINGS

Aspects of the invention will be described in greater detail with reference to the exemplary embodiments shown in the following figures and the description associated therewith. Shown are:

FIG. 1 shows an injection molding device 1 according to the invention in a perspective view obliquely from the front and above.
FIG. 2 shows a center block 17 as used, for example, in the injection molding device 1 according to FIG. 1.
FIG. 3 shows the center block 17 in a view from the side and FIG. 4 in a top view.

DETAILED DESCRIPTION OF THE INVENTION

Figure 1:
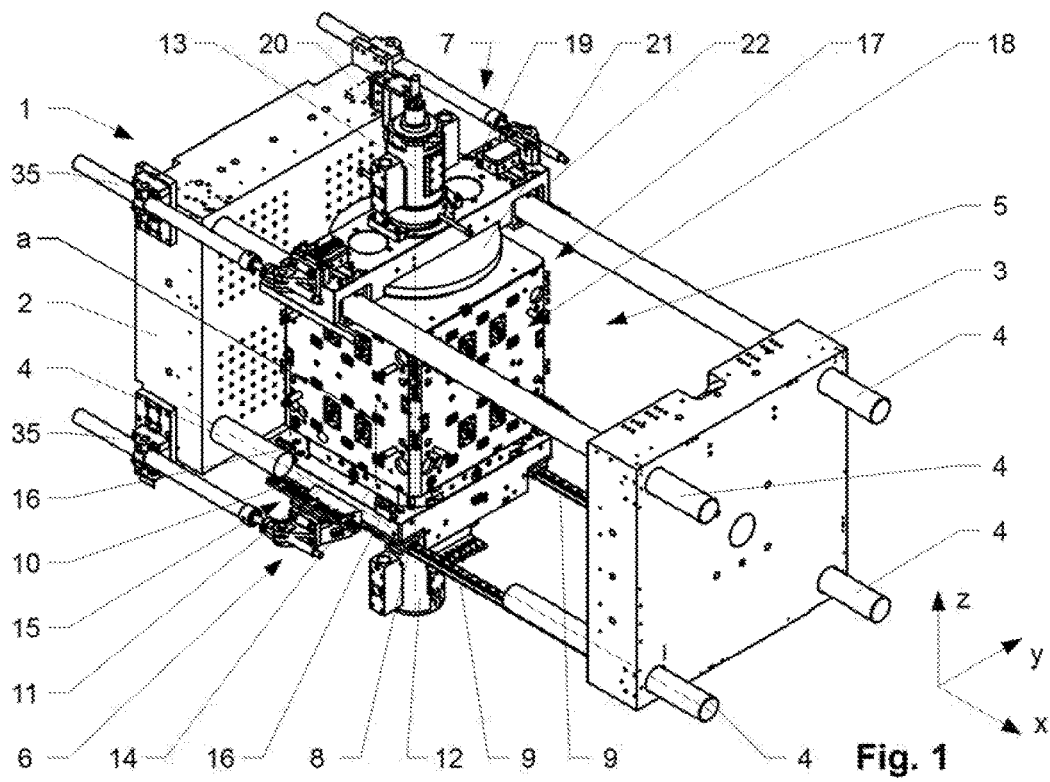
FIG. 1 an injection molding device in a perspective view.

The injection molding device 1 has a first mold mounting plate 2 and a second mold mounting plate 3 movable relative thereto. The mold mounting plates 2, 3 are used for mounting the first and second mold halves of an injection mold (not shown in detail). The mold mounting plates 2, 3 are arranged movably to one another in a first direction (x-direction) along longitudinal guides, here in the form of tie bars 4 of the injection molding device 1. Depending on the area of application and manufacturer of the injection molding device, other types of longitudinal guides are possible. A holding device 5 can be recognized between the two mold mounting plates 2, 3. This has a lower holding device 6, which in the embodiment shown comprises a lower cross member 11, which is arranged movably in the direction of the tie bar 4 (x-direction). The lower cross member 11 is supported in the vertical direction on a rail system 9 on a machine bed (not shown in detail) of the injection molding device 1 via first bearing blocks 8. So that the structure of the lower cross member and its support on the guide rails 9 is better visible, the lower front tie bar 4 is shown partially in section (the course of the sectioned tie bar is represented by a dashed line 10).

The lower holding device 6 and the cross member consist of a base plate 11 on which a lower rotary system 12 is fixed. The lower rotary system 12 has lower rotary plate 14 which is rotatable about an axis of rotation 13 arranged vertically here, the rotary plate having rectangular design in the embodiment shown. The lower rotary plate 14 is driven by a motor 15, which is arranged here below the base plate 11 and is thus not visible in the representation shown.

As can be seen in FIG. 1, further bearing blocks 16 are mounted on the base plate 11 as needed, which are operatively connected with the lower tie bars 4 in the y-direction and serve to at least partially support, the torque generated by the motor 15 and acting on the base plate 11 against the tie bars 4. This arrangement has the advantage that the guide rails 9 and the first bearing blocks 8 can be largely unloaded from the torque of the motor 15. The second bearing blocks 16 are advantageously arranged as far away from the axis of rotation 13 and from one another, respectively, (see distance a) as possible, so that they are more effective due to the larger lever arm. An advantage of the arrangement shown is that the lower rotary plate 14 can be turned more quickly and thus the production speed can be reduced.

Figure 3:
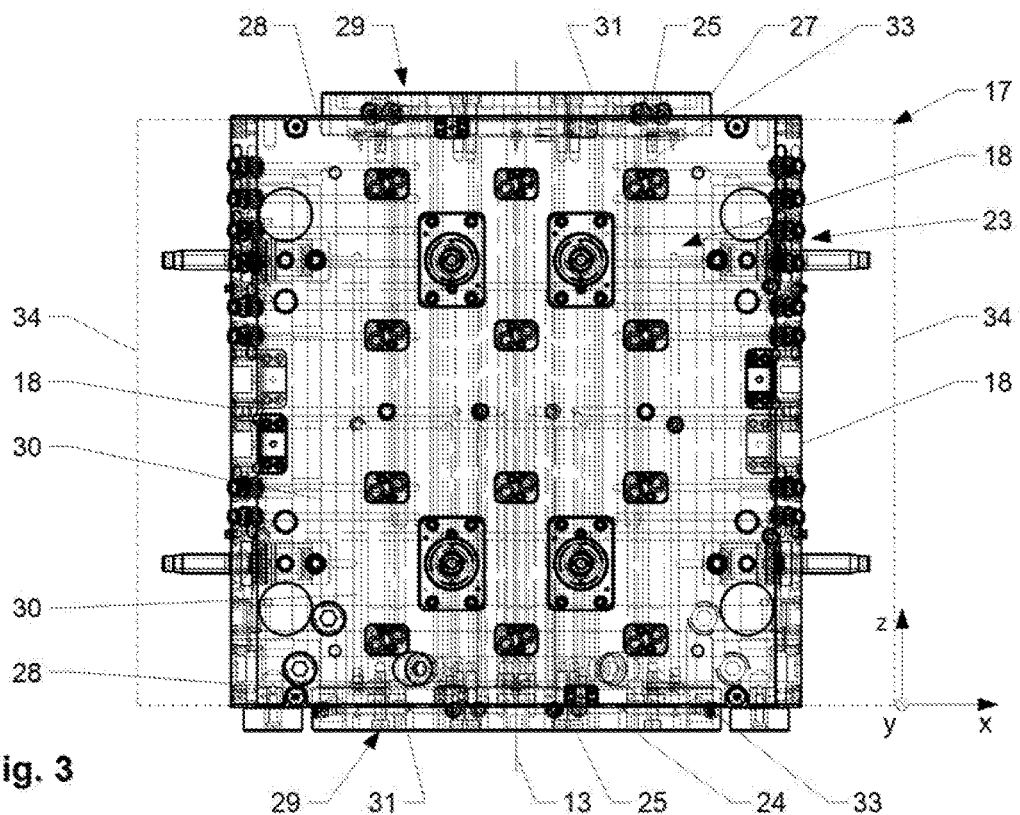
FIG. 3 the middle block according to FIG. 2 in a side view.
Figure 4:
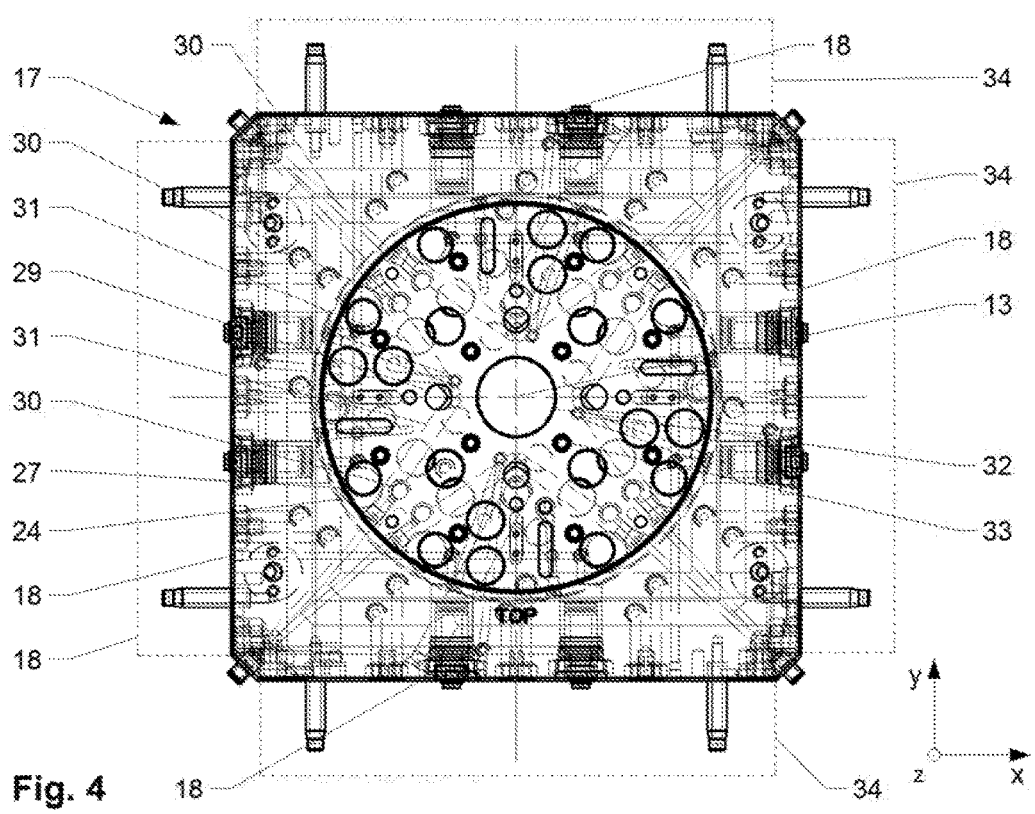
FIG. 4 the middle block according to FIG. 2 in a top view.

A center block 17 is arranged on the lower rotary plate 14. This has side surfaces 18, which serve to receive pair wise opposing inner mold halves 34 (see FIGS. 3 and 4, schematically indicated with dashed lines). These interact with correspondingly formed first and second outer mold halves (not shown), which are fixed on the first and the second mold mounting plate 2, 3. The structure of the center block 17 is explained in detail below.

In the embodiment shown, the holding device 5 additionally comprises an upper retaining device 7 in addition to the lower one. On this is fixed an upper cross member 19 having an upper rotary system 20, as well as an upper rotary plate 21. The center block 17 is rotatable arranged about the axis of rotation 13 between the two rotary plates 14, 21. The upper cross member 19 has a yoke-shaped design and is seated on the two upper tie bars 4. Third bearing blocks 22, which can at least partially engage around the upper tie bars 4 in an assembled state, are arranged on the ends. The upper cross member 19 is synchronously movable with the lower cross member 7 along the tie bars 4. It is driven by means of a linear drive 35, which consists here of four hydraulic cylinders. Other, such as electric drives, are possible.

In particular through the combination of the special design of the lower holding device 6 and the center block 17 according to the invention, the holding device 5 shown has the advantage that the upper cross member 19 or the upper rotary system 20, respectively, can in principle be omitted, or flexibly combined thereto as needed.

Figure 2:
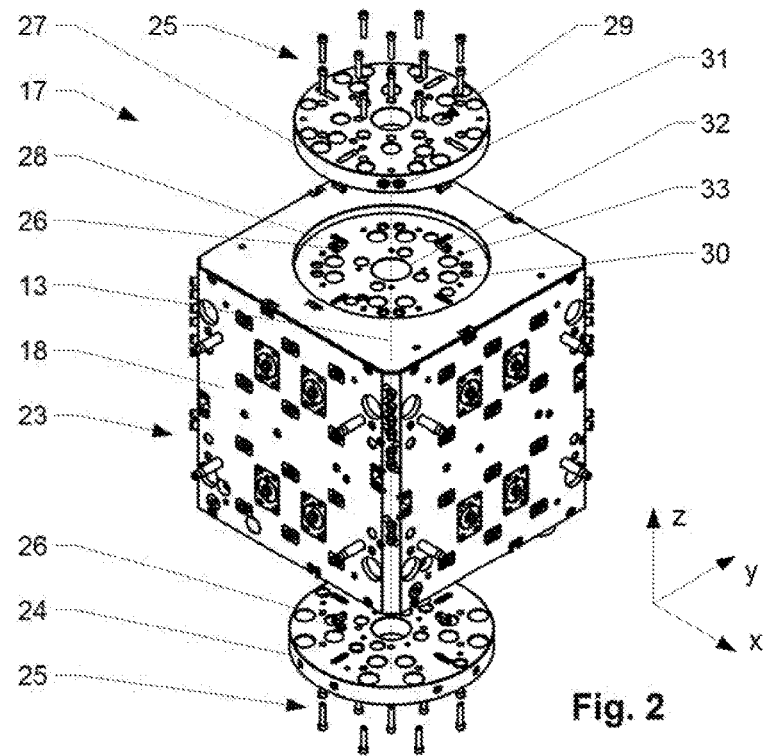
FIG. 2 a center block in a perspective view.

FIG. 2 shows the central block 17 in an exploded view (disassembly in the z-direction) at an angle from obliquely above. FIG. 3 shows the center block 17 in a side view and FIG. 4 in a top view. In FIG. 4, hidden lines are shown by dashed lines.

The center block 17 has a main body 23, as well as at least one lower coupling plate 24. This is fixed on the underside of the main body 23 by means of screws 25 and their associated blind holes 33, the blind holes being provided with threading. If necessary, feather keys 26 acting in circumferential direction with respect to the axis of rotation 13 can be provided for the transmission of forces.

The main body 23 is advantageously manufactured from a material having a lower density than that of the lower coupling plate 24. Good results are obtained when the main body 23 is made from aluminum or another light metal (e.g. a magnesium alloy). The mold halves 35 (schematically represented by dashed lines), which are fixed during operation on the side surfaces 18, are made of a suitable material for the respective injection molding manufacturing process. In general, tool steel is used. Other materials are possible. In operation, the lower coupling plate 24 establishes the operative connection between the center block 17 and the lower rotary plate 14, and is advantageously manufactured from an abrasion-resistant and durable material, such as tool steel.

Due to the lower density of the material of the main body 23, the weight acting on the holding device 5 is reduced, as well as the mass moment of inertia about the axis of rotation 13. This results in the advantages that the holding device 5 (see FIG. 1) is unloaded and can be rotated faster in comparison to conventional devices.

In one variant, the main body 23 is manufactured from a suitable material by means of a 3D-printing process. This has the advantage that the interior and in particular the media lines can be flexibly designed and optimally guided. This results in an optimized weight distribution and an improved cooling. Furthermore, the main body 23 may have cavities which contribute to weight reduction. This is not possible in the case of conventionally manufactured main bodies 23. Alternatively or in addition, targeted reinforcements (not shown) can be inserted or incorporated. After hardening or tempering of the printed material, the side surfaces or the connecting surfaces can be mechanically finished as needed.

In the embodiment shown, the center block 17 additionally has an upper coupling plate 27, which is mounted on the top of the main body 23 by means of screws 25. To improve the mechanical coupling, feather keys 26 can also be used here. Both the lower and the upper coupling plate 24, 27 can be arranged partially embedded in recesses 28 provided for this purpose in the bottom or the top of the main body 23. In the area of the lower and/or if provided the upper coupling plate 24, 27 may comprise one or more connections 29, for example in the form of quick couplings (not shown in detail) for the transfer of media between the holding device 5 and the main body 23. The connections may be mounted on at least one of the coupling plates 24, 27. The coupling plates 24, 27 can produce an operative connection between the at least one connection and the media lines extending in the interior of the main body 23. As media lines 30 are generally used a plurality of bores 30 extending in different directions in the interior of the main body 23, the bores having an operative connection with one another. At least one of the coupling plates 24, 27 may take on a collection function for a plurality of media lines 30. For this purpose, the at least one coupling plate 24, 27 may have one or more collector lines 31, which operatively connect one or more connections 29 with one or more media lines 30. In general, the collector lines 31 are bores which extend within the lower or upper coupling plate 24, 27, respectively, transversely to the axis of rotation 13. They are fixedly or releasable closed on the side surface of the corresponding coupling plate 24, 27, for instance with a plug. If needed, the at least one coupling plate 24, 27 can be formed in multiple parts. For a reduction of weight, the main body 23 may have inner cavities. There exists the possibility, for example, to introduce one or more hollows 32 extending in the axial direction, which contribute to weight reduction. If needed, the hollows 32 may be used for additional purposes, for instance the passage of lines for media, etc. If needed, at least one of the coupling plates 24, 27 may be manufactured from a suitable material by means of a 3D printing process. Other treatment steps are possible.

The invention claimed is:

1. An injection molding device including a holding device for a rotatable mold center part in an injection molding machine comprising:
   a lower cross member which is mounted movably in a longitudinal direction (x) while supported via first bearing blocks and guide rails on a machine bed of the injection molding machine;
   a lower rotary plate which is rotatable about an axis of rotation with respect to the lower cross member and driven by a motor, the rotary plate holding the rotatable mold center part; and
   wherein the center part comprises a center block and includes a main body and a lower coupling plate fixed thereon, wherein the main body comprises a material having a lower density than the lower coupling plate.

2. The injection molding device according to claim 1, further including second bearing blocks supporting the lower cross member in a circumferential direction relative to tie bars of the injection molding machine.

3. The injection molding device according to claim 2, wherein the second bearing blocks are floatingly mounted in a vertical direction (z) relative to the lower cross member.

4. The injection molding device according to claim 2, wherein the second hearing blocks are adjustably arranged relative to the lower cross member.

5. The injection molding device according to claim 2, wherein the second bearing blocks at least partially engage around the tie bars from an inside of the tie bars outwards.

6. The injection molding device according to claim 2, wherein the second bearing blocks are arranged diagonally to one another relative to the axis of rotation.

7. The injection molding device according to claim 2, wherein the cross member includes a base plate and the second bearing blocks are arranged on top of and/or laterally on the base plate.

8. The injection molding device according to claim 2, wherein at least one second bearing block is releasable operatively connected with the cross member.

9. The injection molding device according to claim 1, wherein the holding device comprises an upper holding device, by means of which the rotatable center part is mounted relative to two tie bars of the injection molding machine.

10. The injection molding device according to claim 1, wherein the center block includes an upper coupling plate positioned on an opposite side of the main body as the lower coupling plate.

11. The injection molding device according to claim 10, wherein at least one of the lower coupling plate and the upper coupling plate are manufactured using a 3D printing process.

12. The injection molding device according to claim 1, wherein the center block includes an upper coupling plate positioned opposite of the main body from the lower coupling plate and wherein at least one of the lower coupling plate and the upper coupling plate includes at least one collector line, which operatively connects at least one connection with at least one media distributor extending in the main body.

13. The injection molding device according to claim 1, wherein the main body is manufactured using a 3D printing process.

14. An injection molding device including a holding device for a rotatable mold center part in an injection molding machine comprising:
   a lower cross member which is mounted movably in a longitudinal direction (x) while supported via first bearing blocks and guide rails on a machine bed of the injection molding machine;
   a lower rotary plate which is rotatable about an axis of rotation with respect to the lower cross member and driven by a motor, the rotary plate holding the rotatable mold center part, wherein the center part comprises a center block and includes a main body and a lower coupling plate fixed thereon, wherein the main body comprises a material having a lower density than the lower coupling plate; and
   second bearing blocks supporting the lower cross member in a circumferential direction relative to tie bars of the injection molding machine, and wherein the second bearing blocks are arranged in pairs on the tie bar at a distance (a) from one another.

* * * * *